H. G. C. FRAHM.
MARINE VESSEL.
APPLICATION FILED JUNE 23, 1920.

1,427,526.

Patented Aug. 29, 1922.

Witnesses:
Emil Kayser
Robert Schaper

Inventor:
H. G. C. Frahm,
by: Watson, Coit
Morse & Grindle
Attorneys.

UNITED STATES PATENT OFFICE.

HERMANN GUSTAV CARL FRAHM, OF BRAHMSALLEE, HAMBURG, GERMANY.

MARINE VESSEL.

1,427,526.  Specification of Letters Patent.  Patented Aug. 29, 1922.

Application filed June 23, 1920. Serial No. 391,240.

*To all whom it may concern:*

Be it known that I, HERMANN GUSTAV CARL FRAHM, a subject of the German Empire, and resident of Brahmsallee, Hamburg, in the Empire of Germany, have invented certain new and useful Improvements in Marine Vessels, of which the following is a specification.

This invention relates to marine vessels and has for its object to provide improved means for damping the rolling motion of marine vessels such as submarines, merchants' ships and armoured vessels.

According to the present invention, anti-rolling tanks are symmetrically disposed on opposite sides of the longitudinal axis of the vessel at or about the water line, the centre of gravity of each anti-rolling tank being disposed at such a distance from the central vertical axis of the vessel as to provide for the greatest possible damping action of the rolling motion.

For this purpose the anti-rolling tanks comprise inner and outer shells or walls, the outer shell having openings below the water line for the ingress and egress of the water and preferably openings above the water line for the escape of air or water.

In the case of submarines, the anti-rolling tanks may be formed by sub-dividing the space hitherto utilized for submerging tanks, between the inner air-tight shell and the outer shell, so as to form lower submerging tanks and upper anti-rolling tanks, the partitions or walls between the anti-rolling tanks and the submerging tanks being disposed beneath the water line at such a depth as to enable the comparatively small quantity of water required for damping the rolling motion to enter through openings below the water line into the anti-rolling tank. The water inlet openings should be of such dimensions that the water is capable of ingress and egress in synchronization with the periodicity of motion of the volume of water in the anti-rolling tank during rolling motion.

By utilizing a portion of the submerging tanks of the submarine as anti-rolling tanks, a comparatively slight increase of the displacement is necessary, since the space not utilized as anti-rolling tanks, is still maintained for submerging purposes as heretofore. Moreover when the submarine is rising, the anti-rolling tanks provide a certain amount of reserve displacement, since they may be emptied by forcing out the water contained therein, in the same manner as the submerging tanks.

There is also the advantage that no space within the airtight shell is occupied by the anti-rolling tanks and the latter being disposed on the exterior of the vessel, the centre of gravity of the volume of water in the anti-rolling tank is disposed a comparatively great distance from the centre of the vessel, thereby ensuring greater damping effect and necessitating a smaller volume of water in the tanks.

Alternatively, the anti-rolling tanks may be constructed in the form of pockets exterior of the submerging tanks. By this construction the centre of gravity of the volume of water is disposed still further from the middle of the vessel and greater freedom is possible in the construction of the transverse sectional form of the vessel, thus enabling the shape of the vessel, metacentric height, periodicity of rolling and anti-rolling effect to be suitably proportioned.

It will of course be understood that, if desired, the anti-rolling tanks may comprise a combination of the two constructions hereinbefore described as, for example, when the submarine is to be fitted with anti-rolling tanks both amidships and in the bow and stern of the vessel.

The foregoing anti-rolling tanks may also be adapted to merchant ships of the type fitted with lateral stabilizing chambers about the water line, said stabilizing chambers being adapted for use as anti-rolling tanks as above described by the provision of water inlet and outlet openings therein, this construction enabling the vessel to be fitted with anti-rolling tanks without increasing the ship's space and without interfering with its stability.

In the case of armoured vessels, the anti-rolling tanks may be constructed by bending the shell of the ship inwardly about the water line so as to leave a space between the shell of the ship and the outer belt of armour plating, said space being open to the water below the water line to form an armour-plated anti-rolling tank.

In armoured vessels having a belt of armour-plating, the application of the usual anti-rolling tank has hitherto presented difficulties as the internally connected anti-rolling tanks could not be used in many cases owing to the space occupied thereby, whilst the anti-rolling tanks connected exteriorly of the ship could only be utilized beneath the armoured belt, owing to the openings required in the shell of the vessel, which should of course be avoided as far as possible, whilst moreover the disposal of the tanks beneath the armoured belt, that is to say, considerably below the water line, necessitated the air space being maintained under pressure in order to maintain the level of the water at the requisite height in the tank; consequently if the tanks became damaged and allowed the air to escape, the anti-rolling effect no longer took place owing to the tanks flooding with water and forming a constant ballast.

According to the present invention, the anti-rolling tank can be disposed about the water level without interfering with the continuity of the shell of the vessel, the latter being continued upwardly behind the armoured belt and the necessary water inlet for the tanks being provided by the space between the lower edge of the armour plating and the bent shoulder of the shell of the ship. This arrangement also increases the security of the vessel against damage, since the shell of the vessel is spaced from the armour plating and is thus not so liable to be penetrated by projectiles, whilst, if necessary, the inner wall of the anti-rolling tank may also be armoured.

The present improvements are illustrated diagrammatically on the accompanying drawings whereon:—

Figure 1:
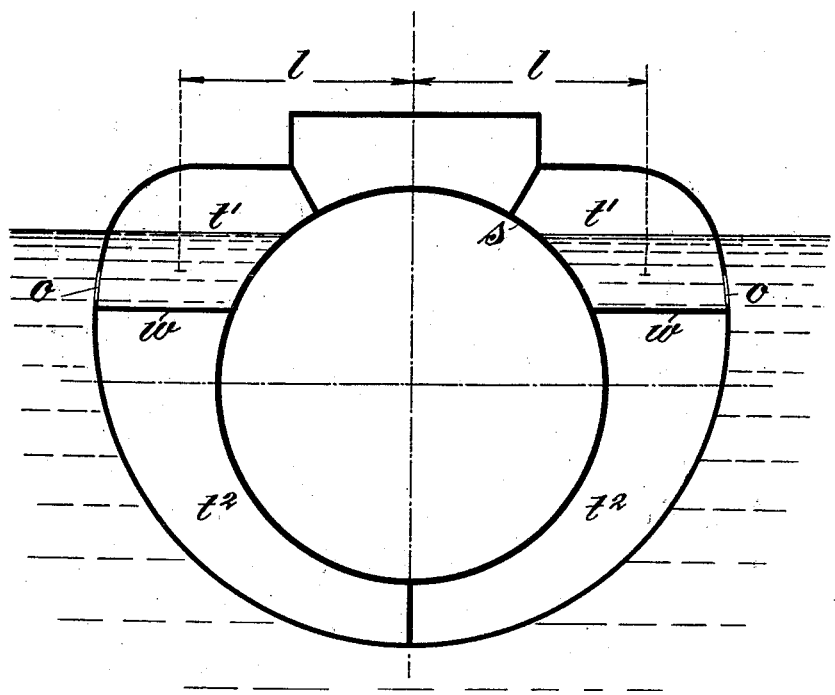
Fig. 1 illustrates a transverse section through one type of submarine boat constructed according to the present invention.

Referring to Fig. 1, $s$ illustrates the inner shell of the submarine vessel around which the submerging tanks $t^2$ are symmetrically disposed. The submerging tanks $t^2$ are closed above by transverse partitions $w$ thereby forming upper anti-rolling tanks $t^1$ provided with apertures $o$ in the outer shell for the ingress and egress of water.

The distance of the centre of gravity of the volume of water contained within the anti-rolling tanks $t^1$ from the centre of the vessel is indicated by $l$. It will be seen that by this construction the outer shell forming the submerging tanks is utilized to form upper anti-rolling tanks $t^1$ and lower submerging tanks $t^2$ and that the anti-rolling tanks $t^1$ may be also utilized as submerging tanks by flooding the same, the tanks $t^1$ being emptied in the usual manner by forcing out the water when the submarine is required to rise, for which purpose the water inlet openings $o$ may be fitted with suitable valves to enable the anti-rolling tanks $t^1$ to be emptied.

Figure 2:
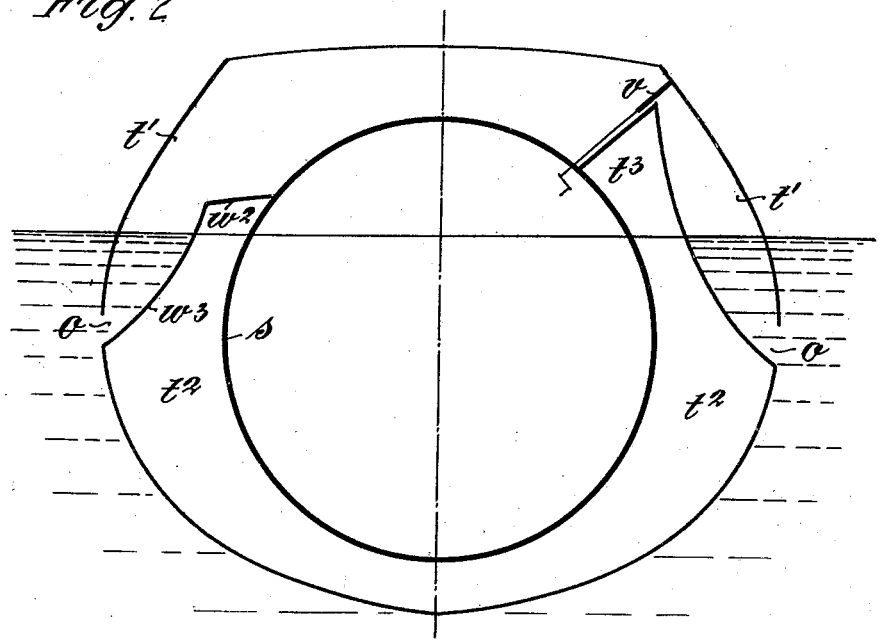
Figs. 2 and 3 are similar views to Fig. 1 illustrating slight modifications thereof.

In the construction illustrated in the left-hand portion of Fig. 2, the submerging tank $t^2$ is closed above by a curved upwardly inclined and inwardly extending cover plate $w^3$, $w^2$, the portion $w^2$ corresponding to only a portion of the partition $w$ of Fig. 1. The partition $w^3$, $w^2$ extends from a point below the water line on the outer shell to a point above the water line on the inner shell and thereby forms a pocket-shaped anti-rolling tank.

As illustrated in the right-hand portion of Fig. 2, the submerging tanks $t^2$ may extend considerably above the water line as illustrated by the extension $t^3$, thereby forming an extended pocket-like-anti-rolling tank $t^1$, the inner wall of the tank $t^1$ either terminating at both ends on the outer shell of the vessel or the upper end being provided with a valve $v$ for opening and closing the upper end of the anti-rolling tank $t^1$ in order to enable the chamber $t^1$ to be flooded or emptied.

Figure 3:
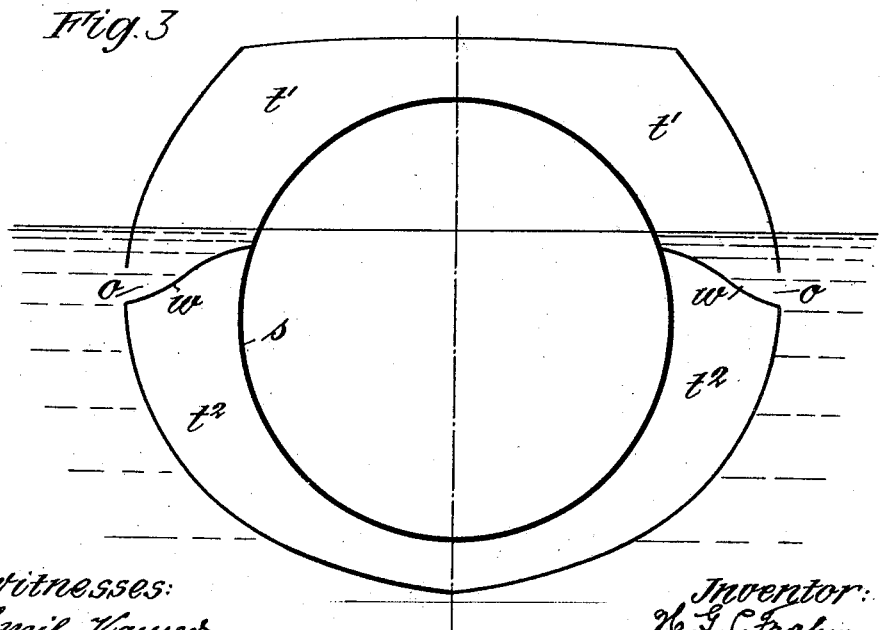

Fig. 3 illustrates a slight modification of the construction illustrated in Fig. 1 in which the cover $w$ of the submerging tanks $t^2$ is slightly inclined.

Figure 4:
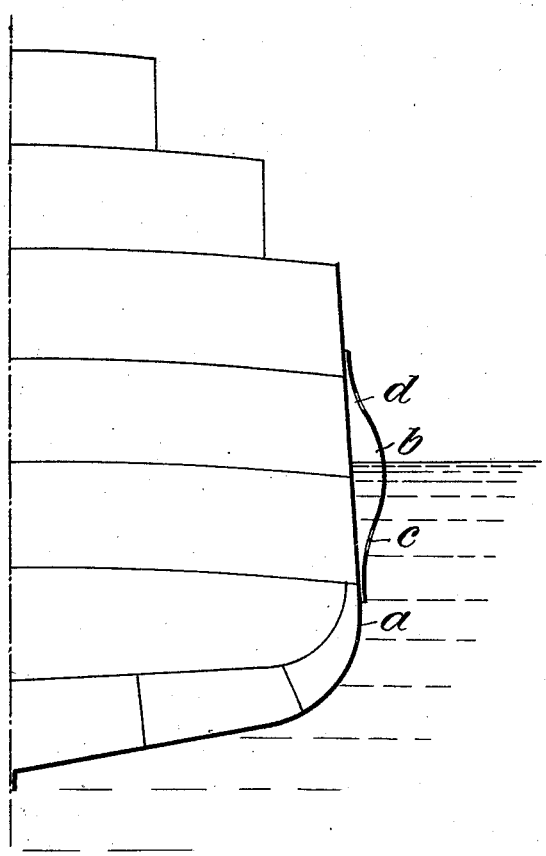
Fig. 4 is a diagrammatic half sectional view of a merchant vessel having the present invention applied and Fig. 5 is a diagrammatic transverse sectional view of the side of an armoured vessel having the invention applied.

Fig. 4 illustrates a merchant vessel which is assumed to be subject to inconsiderable variations in draught and having about the water line on each side of the vessel and secured to the other shell $a$, a lateral stabilizing chamber $b$ which may extend more or less along the length of the vessel. This stabilizing chamber $b$ is provided with an opening $c$ for the water ingress and egress below the water line and with an opening $d$ above the water line for ingress and egress of air. By arranging the water and air inlets and outlets above one another in this manner, the damping effect of the tanks is improved, since the water can flow in a natural path by rising and falling during the damping action.

Figure 5:
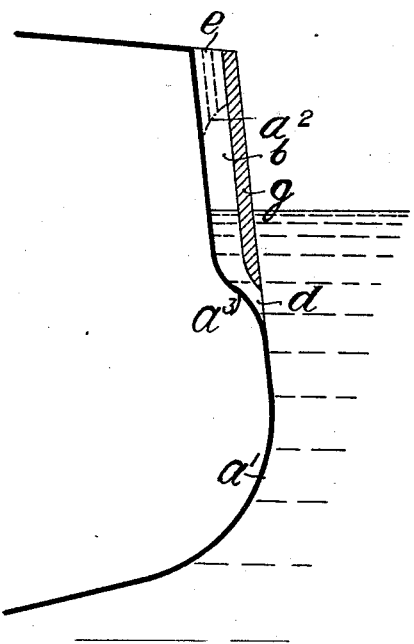

In the construction of the armoured vessel as illustrated in Fig. 5, the anti-rolling tanks $b$ are formed by bending the shell $a^1$ of the vessel inwardly at $a^3$ so as to provide a tank $b$ of the necessary dimensions. The bend $a^3$ is disposed at the lower edge of the armour plating $g$ so that the space $d$ between the lower edge of the armour plating $g$ and the inwardly bent portion $a^3$ of the shell $a^1$ forms the water ingress and egress opening. This opening $d$ may also be of the required size to permit of unrestricted ingress and egress of the water without incontinuity of the shell $a^1$.

If desired the shell $a^1$ may be carried up to the deck as illustrated in full lines in Fig.

5 or it may be bent outwardly as indicated by dotted lines at $a^2$ in Fig. 5 to form a pocket-shaped anti-rolling tank, and in the latter case air passages $e$ may be provided from above the deck into the anti-rolling tank $b$.

Claims:

1. A submarine comprising an inner airtight shell, an outer shell spaced therefrom and having apertures therein below the water line and partitions disposed symmetrically on each side of the longitudinal axis of the submarine between said shells, each partition extending inwardly from a point just below the apertures in the outer shell in a substantially continuous curve to a point above the water line and thereafter turning abruptly inwardly against the inner shell in such a manner that a pocket like water chamber is formed between said partition and outer shell, said chamber being spaced from said inner shell.

2. A submarine as specified in claim 1 having valve means for controlling the upper end of the space formed between said partition and outer shell.

HERMANN GUSTAV CARL FRAHM.